United States Patent
Sancheti et al.

(10) Patent No.: US 12,450,080 B2
(45) Date of Patent: Oct. 21, 2025

(54) CONTROLLING CONTAINER COMMANDS ISSUED IN A DISTRIBUTED COMPUTING ENVIRONMENT

(71) Applicant: Red Hat, Inc., Raleigh, NC (US)

(72) Inventors: Khushboo Sancheti, Mountain View, CA (US); Mandar Darwatkar, Mountain View, CA (US); James Scott, Santa Clara, CA (US); Hoo In Song, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 747 days.

(21) Appl. No.: 17/569,781

(22) Filed: Jan. 6, 2022

(65) Prior Publication Data

US 2023/0214248 A1    Jul. 6, 2023

(51) Int. Cl.
*G06F 9/455*    (2018.01)
*G06F 16/951*    (2019.01)

(52) U.S. Cl.
CPC ...... *G06F 9/45558* (2013.01); *G06F 9/45512* (2013.01); *G06F 16/951* (2019.01); *G06F 2009/45587* (2013.01)

(58) Field of Classification Search
None
See application file for complete search history.

(56) References Cited

U.S. PATENT DOCUMENTS

| | | | |
|---|---|---|---|
| 9,729,579 B1 * | 8/2017 | Marino | H04L 63/101 |
| 9,858,428 B2 * | 1/2018 | Barton | H04L 67/10 |
| 9,900,313 B2 | 2/2018 | Wiest et al. | |
| 10,021,066 B2 * | 7/2018 | Keis | H04L 61/5007 |
| 10,063,469 B2 * | 8/2018 | Shen | H04L 45/16 |
| 10,182,076 B2 * | 1/2019 | Chen | H04L 63/20 |
| 10,404,474 B1 * | 9/2019 | Caceres | H04L 9/3268 |
| 10,586,042 B2 * | 3/2020 | Stopel | G06F 21/554 |
| 10,599,423 B2 * | 3/2020 | Coleman | G06F 8/63 |
| 10,929,200 B1 * | 2/2021 | Whitehead | G06F 9/44505 |
| 10,956,563 B2 * | 3/2021 | Gerebe | G06F 21/54 |
| 11,310,057 B2 * | 4/2022 | Chen | H04L 67/10 |
| 11,403,401 B2 * | 8/2022 | Gajananan | G06F 21/64 |

(Continued)

FOREIGN PATENT DOCUMENTS

| | | |
|---|---|---|
| CN | 110995450 B | 6/2020 |
| CN | 111796858 A | 10/2020 |

(Continued)

OTHER PUBLICATIONS

Struhár et al. "REACT: Enabling Real-Time Container Orchestration", 2021 IEEE, 8 pages.*

(Continued)

*Primary Examiner* — Van H Nguyen
(74) *Attorney, Agent, or Firm* — Kilpatrick Townsend & Stockton LLP

(57) ABSTRACT

In one example described herein a system can intercept, using a webhook, a container command issued to a user interface of a container orchestration platform. In response to intercepting the container command, the system can determine that the container command violates a security policy. In response to determining that the container command violates the security policy, the system can prevent the container command from being executed in relation to a container of the container orchestration platform.

18 Claims, 5 Drawing Sheets

(56) References Cited

U.S. PATENT DOCUMENTS

| | | | |
|---|---|---|---|
| 11,582,589 B2* | 2/2023 | Taft | H04L 63/14 |
| 11,595,408 B2* | 2/2023 | Beddus | G06F 9/5061 |
| 11,816,469 B2* | 11/2023 | Tu | G06F 8/65 |
| 2016/0344690 A1* | 11/2016 | Keis | H04L 61/5007 |
| 2019/0156023 A1* | 5/2019 | Gerebe | G06F 21/51 |
| 2019/0303345 A1* | 10/2019 | Zhu | H04L 67/141 |
| 2021/0314300 A1 | 10/2021 | Shen et al. | |
| 2021/0397712 A1* | 12/2021 | Gajananan | G06F 21/53 |
| 2023/0088858 A1* | 3/2023 | Tu | G06F 8/65 |

FOREIGN PATENT DOCUMENTS

| | | |
|---|---|---|
| CN | 112202713 A | 1/2021 |
| CN | 112929180 A | 6/2021 |
| CN | 113204388 A | 8/2021 |

OTHER PUBLICATIONS

Garg et al. "Automated Cloud Infrastructure, Continuous Integration and Continuous Delivery using Docker with Robust Container Security", 2019 IEEE, pp. 467-470.*

Nam, J., et al., "Bastion: A Security Enforcement Network Stack for Container Networks," USENIX, 2020, https://www.usenix.org/system/files/atc20-nam.pdf.

"Using Admission Controllers," Kubernetes, 2021, • https://kubernetes.io/docs/reference/access-authn-authz/admission-controllers/#validatingadmissionwebhook.

"Admission Controller," Sysdig Documentation, Downloaded from Internet 2022, • https://docs.sysdig.com/en/admission-controller.html.

Kuriel, M., "Runtime Protection for K8s Workloads Using a Mutating Admission Controller," Aqua Blog, Nov. 11, 2020, • https://blog.aquasec.com/kubernetes-runtime-security.

\* cited by examiner

CONTROLLING CONTAINER COMMANDS ISSUED IN A DISTRIBUTED COMPUTING ENVIRONMENT

TECHNICAL FIELD

The present disclosure relates generally to computer security. More specifically, but not by way of limitation, this disclosure relates to controlling container commands issued in a distributed computing environment.

BACKGROUND

Distributed computing environments (e.g., cloud computing systems, data grids, and computing clusters) have recently grown in popularity given their ability to improve flexibility, responsiveness, and speed over conventional computing systems. The way in which software programs are deployed inside distributed computing environments has also evolved in recent years. Software programs such as applications and microservices are often now deployed in distributed computing environments using containers. A container is a relatively isolated virtual environment that can be generated by leveraging resource isolation features (e.g., cgroups and namespaces) of the Linux kernel. Deploying software programs inside containers can help isolate the software programs from one another and provide other benefits.

To help automate the deployment, scaling, and management of software programs inside containers, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments. Some orchestration platforms, like Kubernetes, have an application programming interface (API) that serves as a centralized administrative user interface through which users can issue commands.

DETAILED DESCRIPTION

Figure 1:
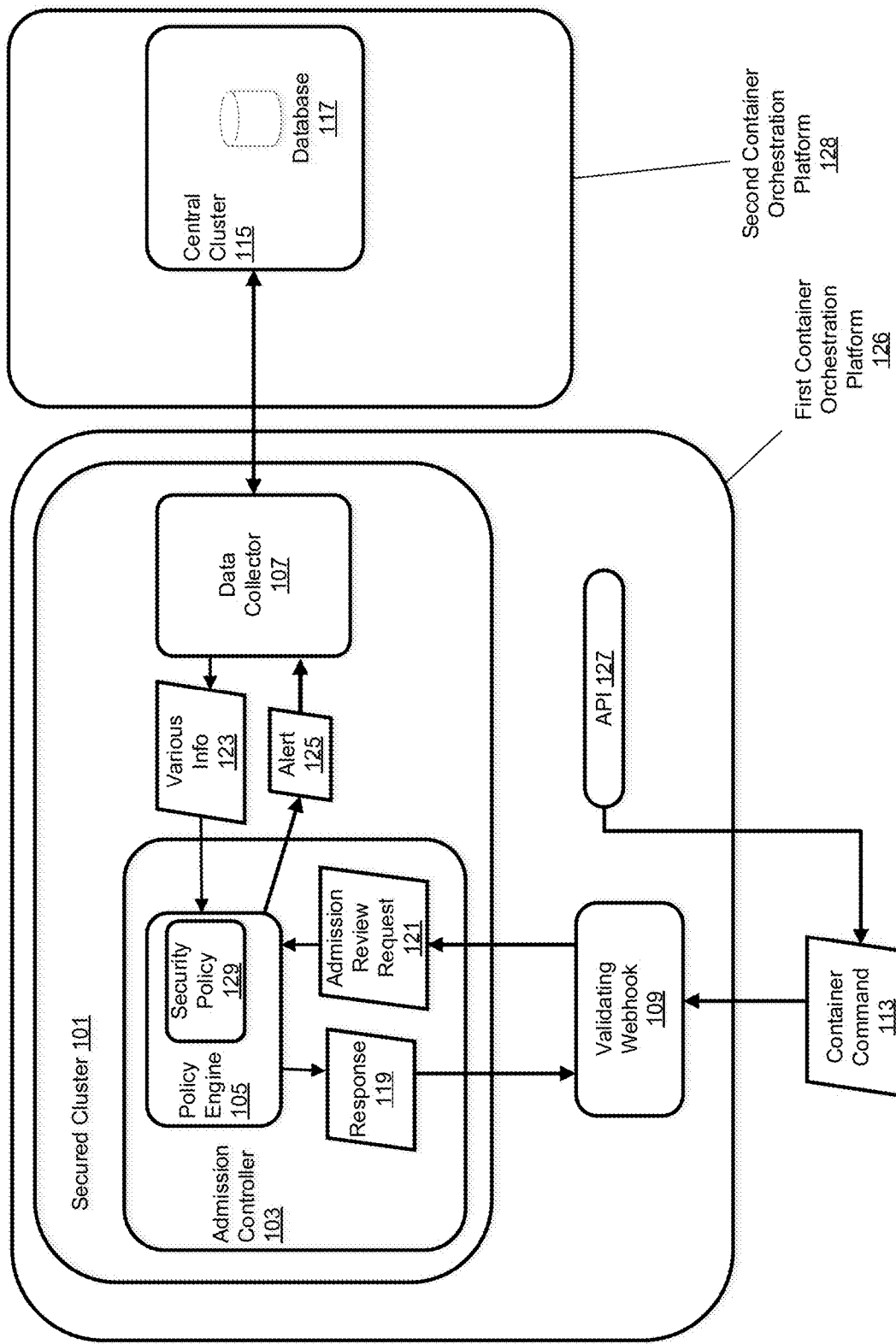
FIG. 1 is a block diagram of an example of a system for implementing some aspects of the present disclosure.

Container orchestration platforms may include an application program interface (API) that serves as a central administrative control system to which users may issue container commands to configure software applications running within containers. For example, a user may issue an "exec" command to the API to cause a container to execute certain functions. Another example, a user may issue a "port-forward" command to the API to configure certain port-forwarding functions. But the API often lacks security controls. As a result, users may be able bypass their security restrictions by issuing commands to the API. For example, a distributed computing environment may have rule-based access controls (RBAC) that completely prevent non-privileged users from executing certain commands, regardless of the situation. These RBAC rules are broadly applicable and may be over-inclusive as a result. Beyond being over-inclusive, in some cases the RBAC rules can be circumvented, at which point users can then issue commands to specific containers and container pods using the API. With this approach, users can indirectly issue commands to specific containers and container pods via the API to avoid their security restrictions. This lack of security can introduce an attack vector to containers that may be exploited by malicious actors. While one solution may be to configure the API to prevent all execution of certain commands, like the exec command and port-forward command, this solution is overbroad and prevents the legitimate use of such commands. For example, the exec command and port-forward commands are often used for legitimate troubleshooting purposes. Completely forbidding execution of such commands may result in a loss of important troubleshooting functionality.

Some examples of the present disclosure can overcome one or more of the abovementioned problems by introducing a security system to govern authorization of container commands issued through the API. A container command can be a command issued to the API for controlling some aspect of the operation of a container managed by the container orchestration platform. More specifically, the security system may intercept a container command issued to the API. The security system can intercept the container command using a webhook, in some examples. In response to intercepting the container command, the security system may determine whether the container command complies with or violates a security policy. There can be one or more security policies with various conditions that may need to be met to allow the execution of the container command. If the security system determines that the container command does not violate one or more security policies, the security system can allow execution of the container command. If the security system determines that the container command does violate the one or more security policies, the security system may prevent the container command from being executed. The security system can also record the attempted container command for later evaluation by security personnel. In this way, the security system can monitor and control how and when certain container commands are allowed to execute. This may allow for a more granular level of control over the execution of such commands, for example so that malicious activities may be prevented while legitimate troubleshooting activities may be allowed.

In some examples, the security policy may be evaluated using various data collected by a data collector. The data collector can be a software application that collects data from various components for use by the security system in evaluating container commands associated with a target container against the security policy. Examples of this various data may include the operating system version of the target container, the name of the target container, or the number of processor cores the target container is permitted to use. For instance, a container command may be found to be in violation of a security policy if execution of the container command is attempted for a target container that has an operating system version for which the container command is prohibited.

In some examples, the security system could serve as a common exception framework through which users accessing a distributed computing environment may be granted or denied the ability to execute certain container commands based on a common (i.e., the same) set of factors, as defined in the security policy. This may be different from, for example, granting or denying access to certain container commands or features based on user-specific privileges or roles, or based on user- or group-specific RBACs.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for implementing some aspects of the present disclosure. The system includes a first container orchestration platform 126 for managing containers inside a secured cluster 101. The system also includes a second container orchestration platform 128 for managing containers inside a central cluster 115.

The secured cluster 101 includes an admission controller 103 and a data collector 107. The admission controller 103 includes a policy engine 105 that can be executed in response to a validating webhook 109. The validating webhook 109 may be triggered in response to a container command 113 issued to an application programming interface (API) 127 of the first container orchestration platform 126. The validating webhook 109 may have a corresponding configuration object. The corresponding configuration object may specify which container command or commands trigger the validating webhook 109. The policy engine 105 may evaluate the container command 113 against one or more predefined security policies 129, which may take into account various types of information 123 from the data collector 107 in the evaluation process. If the policy engine 105 determines that the container command 113 violates the one or more security policies 129, the policy engine 105 can issue an alert 125 to the data collector 107, which in turn may pass the alert 125 on to the central cluster 115 usable to manage the secured cluster 101. The central cluster 115 may contain a database 117 in which such alerts 125 may be stored and further evaluated.

More specifically, the validating webhook 109 may be designed to intercept a container command 113. Examples of the container command 113 can include an exec command and a port-forward command. The exec command can allow the user to control a target container and cause it to execute certain functions. The port-forward command can allow the user to establish port forwarding to a target container. Container commands, such as the exec command and the port forward command, can allow the user to bypass security restrictions. Another example container command, a delete command, may allow deletion of container resources by filename, standard input stream, or by label sector. Another example container command, rollout undo, can undo a previous rollout of container elements. The container command 113 may be issued by a user using a user interface of either the first container orchestration platform 126 or the second container orchestration platform 128. An example of the user interface may be the API 127 described above. The validating webhook 109 may detect the container command 113 and, in response, generate an admission review request 121 associated with the container command 113. The validating webhook 109 can then transmit the admission review request 121 to the policy engine 105. The validating webhook 109 may enable enforcement of the security policy 129 by intercepting the container command 113 before the container command 113 can execute. The policy engine 105 may return a response 119 (e.g., an allowance or denial) of the container command 113 to the validating webhook 109, or another component of the admission controller 103, after evaluating the container command 113 against the one or more predefined security policies 129.

The policy engine 105 may receive various kinds of information 123 from the data collector 107 for use in its evaluation process. For example, the policy engine 105 may have one or more predefined security policies 129, which may include one or more policy criteria. Some of the policy criteria may depend on the various kinds of information 123 gathered from the data collector 107, as described in greater detail later on.

The admission controller 103 may be deployed in the secured cluster 101 and may be monitored by the central cluster 115. The admission controller 103 may be designed to be unalterable by the container command 113. The admission controller 103 may accept security policies 129 or policy criteria from the central cluster 115, via the data collector 107, and pass it to the policy engine 105 for use in the evaluation process. The admission controller 103 may execute the policy engine 105 to perform a policy evaluation.

In some examples, the admission controller 103 may evaluate the list of policy criteria against various kinds of information 123 associated with an attempt of the container command 113. The various kinds of information 123 may include, but is not limited to, the examples listed in Table 1 below. The admission controller 103 may alert 125 an administrator in response to detecting a policy violation. For example, the admission controller 103 can transmit the alert 125 to a computing device associated with the administrator to warn the administrator of the attempted container command 113. The computing device may be any suitable type of user device, such as a mobile phone, laptop computer, or tablet. Alternatively, the computing device may be part of the central cluster 115, which can be used to manage multiple secured clusters and can be monitored by the administrator. The administrator can also receive the alert 125 via JIRA®, Slack®, e-mail, text message, Microsoft Teams®, Pager Duty®, or any other form of communication. The alert 125 can contain a categorization of the security policy violated.

In some examples, the data collector 107 may act as an intermediary between the admission controller 103 and the central cluster 115, though other embodiments are also contemplated herein that may exclude the data collector 107 or integrate its functionality into other components of the system such as the admission controller 103. The data collector 107 may be aware of the policy criteria within the policy engine 105. Based on the policy criteria, the data collector 107 may perform introspection into the secured cluster 101 to collect various types of information 123 usable by the policy engine 105 in its evaluations. Examples of such information may include the hardware and software components of the secured cluster 101, and the configurations or settings thereof. Some specific examples of the information 123 are described in Table 1 below. The following examples are to be understood within the context of a target container for which a container command has been issued, and the container image usable to deploy the target container.

TABLE 1

Examples of Collected Information

| Information Example | Description | Phase of Deployable Object Lifecycle |
| --- | --- | --- |
| Namespace | A name of an isolated group within a cluster. | Deploy |
| Image Registry | A name of the container image registry storing the container image for the target container | Deploy |
| Image Remote | A full name of the container image in a registry, for example library/nginx. | Deploy |
| Image Tag | Identifier for the container Image. | Deploy |
| Days since Image was created | A number of days from container Image creation date. | Build |
| Days since Image was last scanned | A number of days since a last container Image scan. | Build |
| Image is NOT Scanned | No scan data is available for the container Image. | Build |
| CVSS ID | Common Vulnerability Scoring System Identifier, which can be used to match the container image with vulnerabilities whose scores are greater than, less than, or equal to a specified CVSS. | Build |
| Fixed By | A version string of a package that fixes a flagged vulnerability in the container image. | Build |
| CVE | Common Vulnerabilities and Exposures, which can be used with specific common vulnerability and exposure (CVE) numbers. | Build |
| Image Component | Name and version number of a specific software component present in the container Image. | Build |
| Image OS | Name and version number of a base operating system of the container image. | Build |
| Environment Variable | Environment variables that can define an object deployable by the container orchestration platform by name or value. | Deploy |
| Disallowed Annotation | An annotation which is not allowed to be present on container orchestration platform resources in a specified environment. | Deploy |
| Disallowed Image Label | Check for a presence of a container Image Label that should not be in use. A security policy may trigger if a container image has a specified label. | Deploy |
| Required Image Label | Check for a presence of a required container image label. A security policy may trigger if a container image does not have a specified label. Regular expressions can be used for both key and value fields to match labels. | Deploy |
| Required Label | Check for a presence of a required label in a container orchestration platform. | Deploy |
| Required Annotation | Check for a presence of a required annotation in a container orchestration platform. | Deploy |
| Volume Name | Name of a directory that contains data accessible to containers in a given deployable object under the direction of the container orchestration platform. | Deploy |
| Volume Source | Indicates a form in which a volume is provisioned. For example, persistentVolumeClaim or hostPath. | Deploy |
| Volume Destination | A path where a volume, a single accessible storage area within a single file system, is mounted. | Deploy |
| Volume Type | A type of volume. | Deploy |
| Writable Volume | Volumes that are mounted as writable. | Deploy |
| Protocol | Protocol, such as, Transmission Control Protocol (TCP) or User datagram protocol (UDP), that is used by an exposed port. | Deploy |
| Port | Port numbers exposed by a deployment. | Deploy |
| Privileged | Privileged running deployments. | Deploy |
| Read-Only Root Filesystem | Containers running with a root file system configured as read only. | Deploy |
| Drop Capabilities | Operating System Capabilities that must be dropped from a container. For example CAP_SETUID (which may govern runtime capability) or CAP_NET_RAW (which may govern a binding of a media access control (MAC) address and an Internet Protocol (IP) address. | Deploy |

TABLE 1-continued

Examples of Collected Information

| Information Example | Description | Phase of Deployable Object Lifecycle |
|---|---|---|
| Add Capabilities | Operating System capabilities that must not be added to a container, for instance an ability to send raw packets or override file permissions. | Deploy |
| Port Exposure | Exposure method of a service, for example, load balancer (which may govern connections to a server) or node port (which may route traffic to a cluster). | Deploy |
| Service Account | A name of a Service Account. | Deploy |
| Writable Host Mount | Resource has mounted a path on a host with write permissions. | Deploy |
| Unexpected Process Executed | Check deployments for which process executions are not listed in a deployment's locked process baseline. A baseline may be a policy for computationally simplifying the adoption of containerized workloads. | Runtime |
| Minimum RBAC Permissions | Match if a deployment's container orchestration platform service account has a RBAC permission level equal to or greater than a specified level. | Deploy |
| Container Name | A name of a container. | Deploy |
| Container CPU Request | Check for a number of processor cores reserved for a given resource. | Deploy |
| Container CPU Limit | Check for a maximum number of processor cores a resource is allowed to use. | Deploy |
| Container Memory Request | Check for an amount of memory reserved for a given container. | Deploy |
| Container Memory Limit | Check for a maximum amount of memory that a container is allowed to use. | Deploy |
| Container Orchestration Platform Action | A name of a container Orchestration platform action, such as Pod Exec. | Runtime |
| Container Orchestration Platform Resource | A name of an accessed container orchestration platform resource, such as configmaps (an API object that may allow storage of configurations for deployable objects) or secrets (a deployable object that may contain sensitive data such as a password, token, or key). | Runtime |
| Container Orchestration Platform Resource Name | A name of an accessed container orchestration platform resource. | Runtime |
| Container Orchestration Platform API Verb | A container orchestration platform API verb that is used to access a resource, such as GET or POST. | Runtime |
| Container Orchestration Platform User Name | A name of a user who issued a container command. | Runtime |
| Container Orchestration Platform User Group | A name of a group to which a user belongs. | Runtime |
| User Agent | A user agent that a user used to issue a container command. For example, oc or kubectl, which are both examples of command line tools. | Runtime |
| Source IP Address | An IP address from which a user issued a container command. | Runtime |
| Is Impersonated User | Check if a request was made by a user that is impersonated by a service account or some other account. | Runtime |

The data collector 107 can collect some or all of the above information for a target container or the container orchestration platform 126, 128 associated with the container command 113. The data collector 107 can then provide this information to the policy engine 105, which can evaluate the one or more security policies 129 using this information. As one specific example, the policy engine 105 can determine that a container command 113 violates the security policy 129 because the target container associated with the container command 113 has a prohibited resource name. Another example can involve the policy engine 105 determining a container command 113 is in violation because the security policy 129 prohibits the execution of the container command 113 for clusters or containers with a specified container CPU limit. Another example can involve the policy engine 105 allowing the container command 113 because, although the security policy 129 prohibits the container command 113 for containers with a specified volume name, the target container's filesystem does not have the specified volume name.

Although FIG. 1 shows a certain number and arrangement of components, this is intended to be illustrative and non-limiting. Other examples may include more components, fewer components, different components, or a different arrangement of components than is shown in FIG. 1

Figure 2:
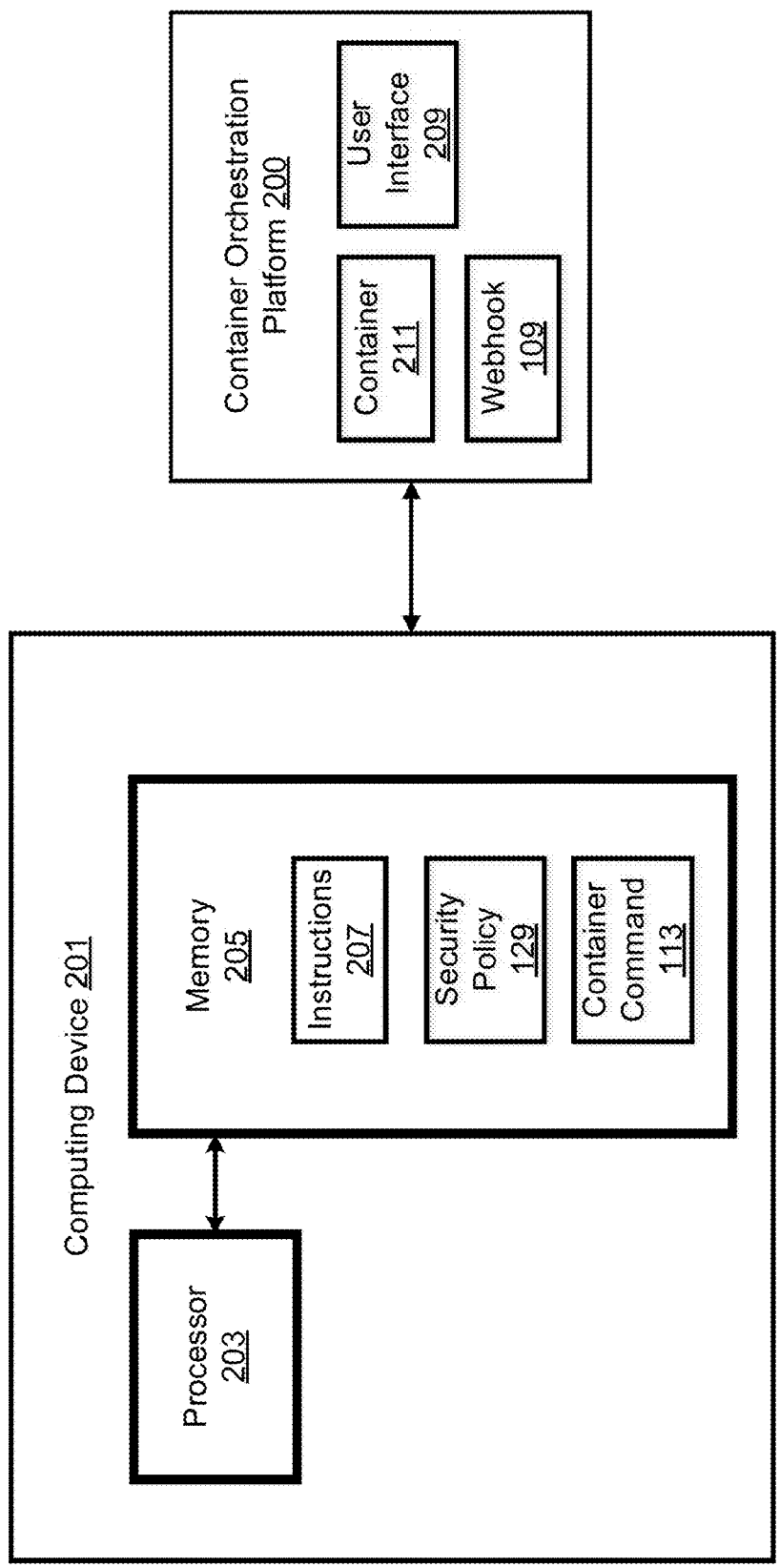
FIG. 2 is a block diagram of an example of a computing device containing instructions for implementing some aspects of the present disclosure.

FIG. 2 is a block diagram of an example of a computing device 201 containing instructions to intercept a container 211 command according to some aspects of the present disclosure. The computing device 201 includes a processor 203 that may be communicatively coupled to a memory 205. In some examples, the processor 203 and the memory 205 can be part of the same computing device. In other examples, the processor 203 and the memory 205 can be distributed from (e.g., remote to) one another. The computing device 201 may be communicatively coupled to a container orchestration platform 200, such as the first container orchestration platform 126 or a second container orchestration platform 128.

The processor 203 can include one processor or multiple processors. Non-limiting examples of the processor 203 include a Field-Programmable Gate Array (FPGA), an application-specific integrated circuit (ASIC), a microprocessor, etc. The processor 203 can execute instructions 207 stored in the memory 205 to perform operations. In some examples, the instructions 207 can include processor-specific instructions generated by a compiler or an interpreter from code written in a suitable computer-programming language, such as C, C++, C #, etc.

The memory 205 can include one memory or multiple memories. The memory 205 can be non-volatile and may include any type of memory that retains stored information when powered off. Non-limiting examples of the memory 205 include electrically erasable and programmable read-only memory (EEPROM), flash memory, or any other type of non-volatile memory. At least some of the memory 205 can include a non-transitory, computer-readable medium from which the processor 203 can read instructions 207. A computer-readable medium can include electronic, optical, magnetic, or other storage devices capable of providing the processor 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the processor 203 can execute the instructions 207 to perform some or all of the functionality described herein. For example, the processor 203 can intercept, using the validating webhook 109, a container command 113 issued to a user interface 209, such as the API 127, of a container orchestration platform 200. The container command 113 may correspond to (e.g., be designated for) a particular container 211 managed by the container orchestration platform 200. In response to intercepting the container command 113, the processor 203 can determine that the container command 113 may violate a security policy 129. In response to determining that the container command 113 violates the security policy 129, the processor 203 may prevent the container command 113 from being executed in relation to a container 211 of the container orchestration platform 200.

Figure 3:
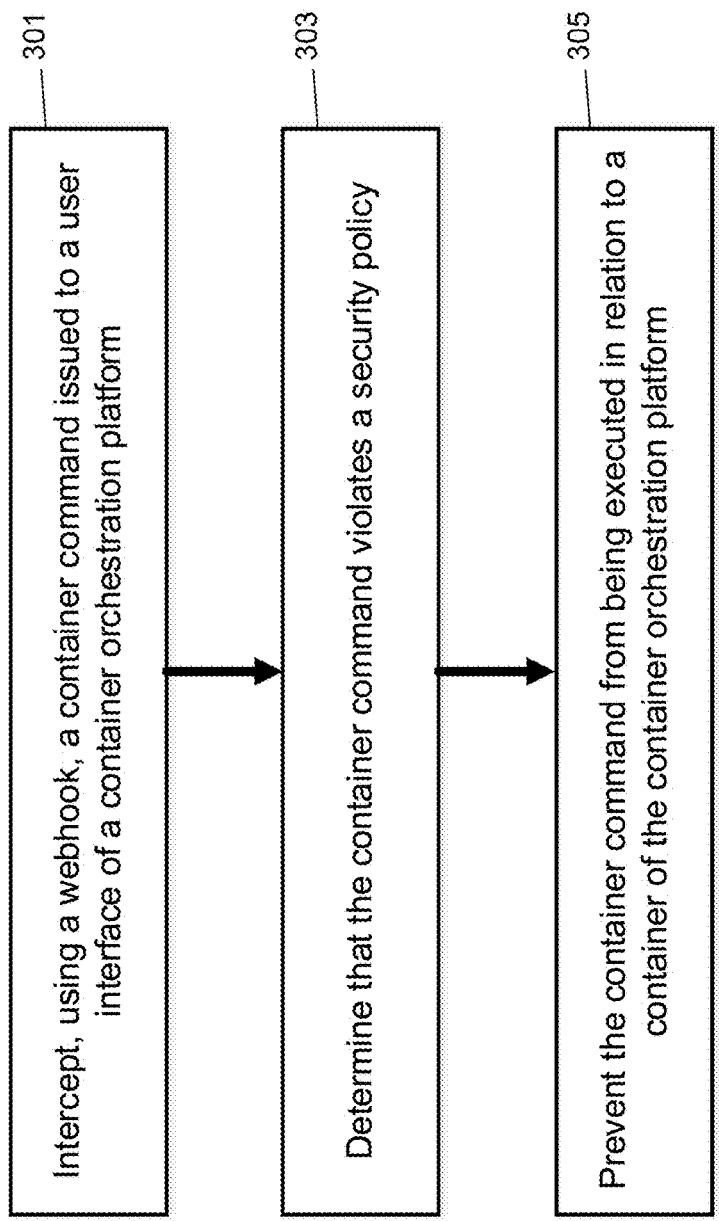
FIG. 3 is a flowchart of an example of a process for preventing execution of a container command according to some aspects of the present disclosure.

In some examples, the processor 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

In block 301, the processor 203 may intercept a container command 113 using the validating webhook 109. The validating webhook 109 may be software designed to be automatically triggered in response to certain events, such as issuance of the container command 113. The validating webhook 109 may forward the container command 113 to the policy engine 105, or may generate an admission review request 121 based on the container command 113. The container command 113 may originate from a user interacting with a user interface 209 of a container orchestration platform 200, such as the first container orchestration platform 126 or the second container orchestration platform 128. In some examples, the container command 113 may be a port-forward command or another type of command.

In block 303, the processor 203 may determine that the container command 113 violates a security policy 129. The admission controller 103 may be executed by the processor 203 to determine the violation of the security policy. The admission controller 103 may govern how container commands issued in a secured cluster 101 are evaluated and validated. The policy engine 105 may perform the evaluation of the admission controller 103. The admission controller 103 may reference various kinds of information 123 gathered from the data collector 107 to make the allowability determination for the container command 113. The various kinds of information 123 may include the examples listed above in Table 1.

In block 305, the processor 203 can prevent the container command 113 from being executed in relation to a container 211 of the container orchestration platform 200. In some examples, preventing the container command 113 from being executed may prevent access to ports of the corresponding container 211. In other examples, preventing the container command 113 from being executed may prevent alterations to the container 211 or execution of certain commands by the container 211. The processor 203 may alert a system administrator of the prevented container command. Additionally or alternatively, the processor 203 may log an instance of the prevented container command in a central database 117 associated with a central management cluster 115.

Figure 4:
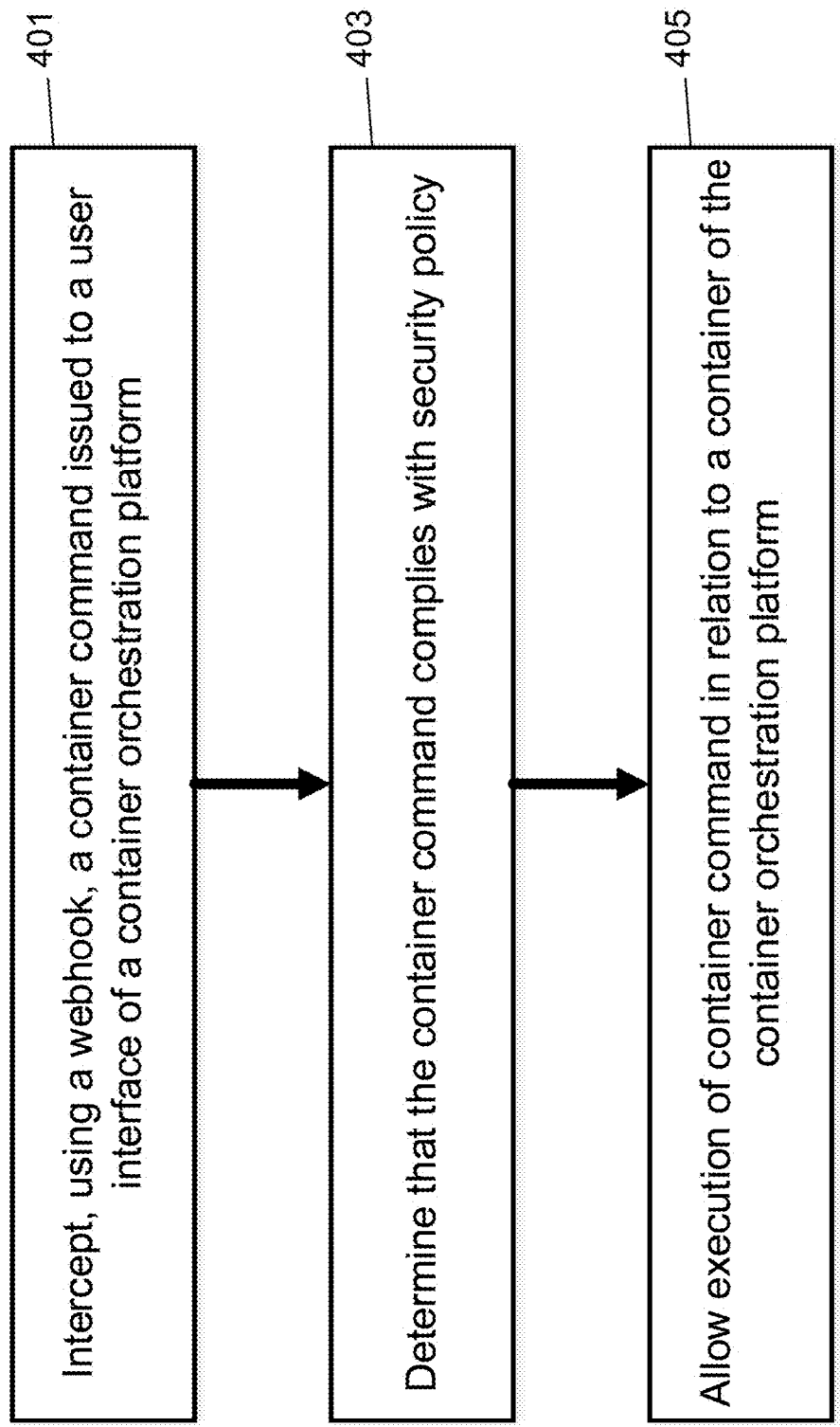
FIG. 4 is a flowchart of an example of a process for allowing execution of a container command according to some aspects of the present disclosure.

In some examples, the processor 203 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIGS. 1-2.

In block 401, the processor 203 may intercept the container command 113 using a validating webhook 109. The validating webhook 109 may forward the container command to the policy engine 105 or may generate an admission review request 121 based on the container command 113. The container command may originate from a user interacting with a user interface 209 of a container orchestration platform 200. In some examples the container command may be a port-forward command or another type of command.

In block 403, the processor 203 may determine the container command complies with a security policy. The admission controller 103 may be executed by the processor 203 to determine compliance with the security policy 129. The admission controller 103 may govern how container commands issued in a secured cluster are evaluated and validated. The policy engine 105 may perform the evaluation of the admission controller 103. The admission controller 103 may reference various kinds of information 123 gathered from the data collector 107 to make the allowability determination for the container command. The various kinds of information 123 may include the examples listed above in Table 1.

In block 405, the processor 203 may allow the execution of the container command 113 in relation to a container 211 of the container orchestration platform 200. In some examples, the processor 203 may alert a system administrator of the executed container command 113. The processor 203 may log an instance of the executed container command in a central database 117 associated with a central management cluster 115.

Figure 5:
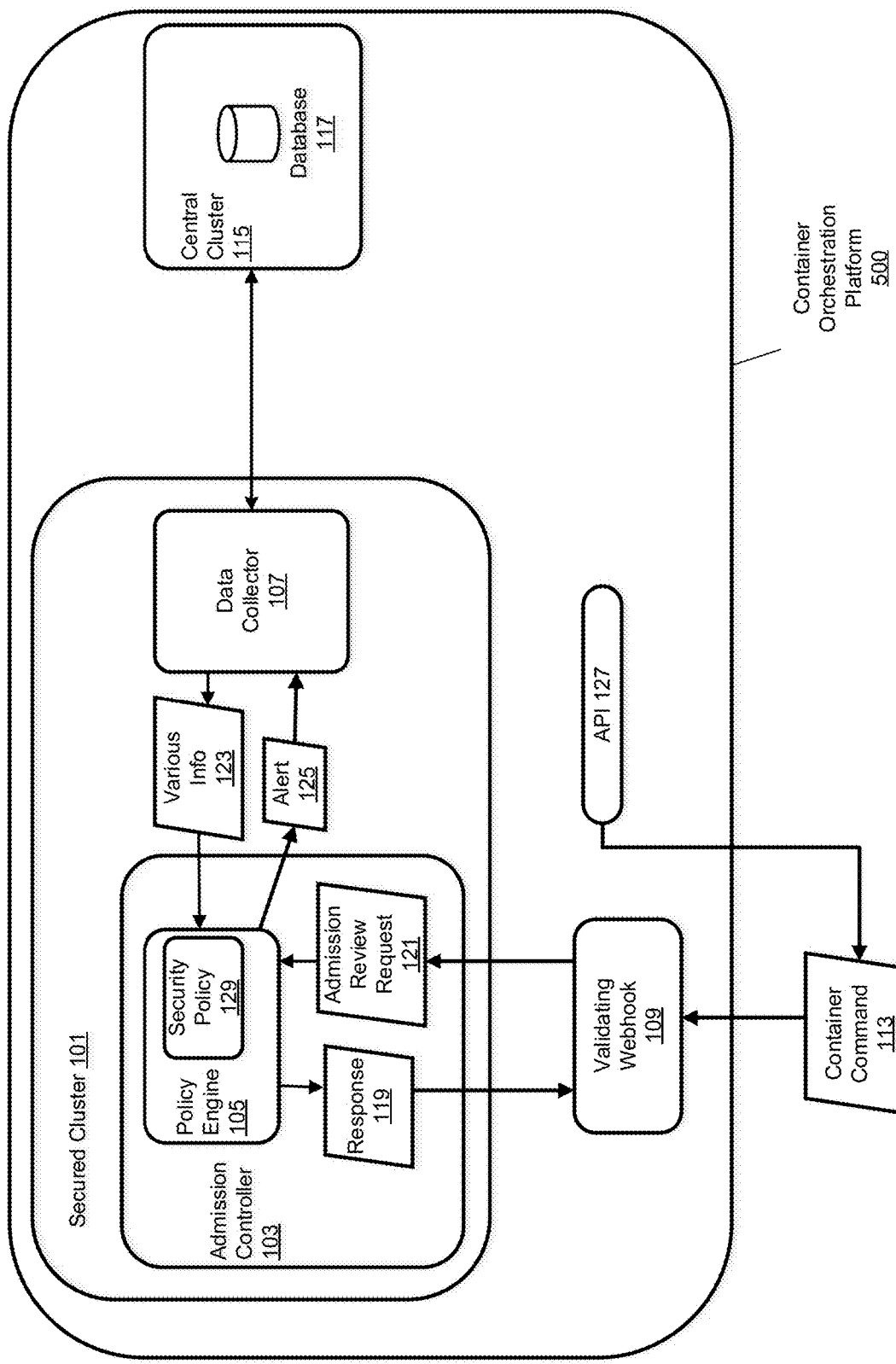
FIG. 5 is a block diagram of an example of a system for implementing some aspects of the present disclosure.

FIG. 5 is a block diagram of an example of a system for implementing some aspects of the present disclosure. FIG. 5 is similar to FIG. 1, except the secured cluster 101 and the central cluster 115 are managed by the same container orchestration platform 500. It will be appreciated that although FIG. 5 shows a certain number and arrangement of components, this is intended to be illustrative and non-limiting. Other examples may include more components, fewer components, different components, or a different arrangement of components than is shown in FIG. 5.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

What is claimed is:

1. A non-transitory computer-readable medium comprising instructions executable by a processor for causing the processor to:
intercept, using a webhook, a container command issued to an application programming interface (API) of a container orchestration platform by a user of the container orchestration platform, wherein the container command is intended to be executed in relation to a target container, and wherein the container command is intercepted before reaching the target container;
in response to intercepting the container command, determine, by an admission controller that is external to the target container, that the container command violates a security policy, wherein the admission controller is executing on the processor; and
in response to determining that the container command violates the security policy, prevent, by the admission controller executing on the processor, the container command from being executed in relation to the target container of the container orchestration platform.

2. The non-transitory computer-readable medium of claim 1, further comprising instructions that are executable by the processor for causing the processor to output an alert to an administrator of the container orchestration platform in response to determining that a condition defined in the security policy is violated.

3. The non-transitory computer-readable medium of claim 1, further comprising instructions that are executable by the processor for causing the processor to:
receive data about the target container from a data collector; and
determine whether the container command violates the security policy based on the data about the target container.

4. The non-transitory computer-readable medium of claim 1, wherein the container command is a port-forwarding command configured to cause a device of the container orchestration platform to initiate port-forwarding to a port of the target container, the port being specified in the container command.

5. The non-transitory computer-readable medium of claim 1, wherein the container command is an exec command configured to cause the target container to run a target command specified in the exec command.

6. The non-transitory computer-readable medium of claim 1, further comprising instructions that are executable by the processor for causing the processor to:
intercept, using the webhook, another container command issued to the API by the user or another user of the container orchestration platform;
in response to intercepting the other container command, determine that the other container command does not violate the security policy; and
in response to determining that the other container command does not violate the security policy, allow the other container command to be executed by one or more containers of the container orchestration platform.

7. A system comprising:
a processor; and
a memory including instructions executable by the processor for causing the processor to:
intercept, using a webhook, a container command issued to an application programming interface (API) of a container orchestration platform by a user of the container orchestration platform, wherein the container command is intended to be executed in relation to a target container, and wherein the container command is intercepted before reaching the target container;
in response to intercepting the container command, determine, by an admission controller that is external to the target container, that the container command violates a security policy, wherein the admission controller is executing on the processor; and
in response to determining that the container command violates the security policy, prevent, by the admission controller executing on the processor, the container command from being executed in relation to the target container of the container orchestration platform.

8. The system of claim 7, wherein the memory further includes instructions that are executable by the processor for causing the processor to output an alert to an administrator of the container orchestration platform in response to determining that a condition is violated.

9. The system of claim 7, wherein the memory further includes instructions that are executable by the processor for causing the processor to:
receive data about the target container from a data collector, the data indicating one or more characteristics of the target container; and
determine that the container command violates the security policy based on the one or more characteristics of the target container.

10. The system of claim 7, wherein the container command is a port-forwarding command configured to cause a device of the container orchestration platform to initiate port-forwarding to a port of the target container, the port being specified in the container command.

11. The system of claim 7, wherein the container command is an exec command configured to cause the target container to run a target command specified in the exec command.

12. The system of claim 7, wherein the memory further includes instructions that are executable by the processor for causing the processor:
intercept, using the webhook, another container command issued to the API by the user or another user of the container orchestration platform;
in response to intercepting the other container command, determine that the other container command does not violate the security policy; and
in response to determining that the other container command does not violate the security policy, allow the other container command to be executed by one or more containers of the container orchestration platform.

13. The system of claim 7, wherein the API is a centralized application programming interface of the container orchestration platform.

14. A method comprising:
intercepting, using a webhook, a container command issued to an application programming interface (API) of a container orchestration platform by a user of the container orchestration platform, wherein the container command is intended to be executed in relation to a target container, and wherein the container command is intercepted before reaching the target container;
in response to intercepting the container command, determining, by an admission controller executing on a processor, that the container command violates a security policy, wherein the admission controller is external to the target container; and
in response to determining that the container command violates the security policy, preventing, by the admission controller executing on the processor, the container command from being executed in relation to the target container of the container orchestra tion platform.

15. The method of claim 14, further comprising:
receiving information about the target container or the container orchestration platform from a data collector; and
determining that the container command violates the security policy based on the information.

16. The method of claim 14, wherein the container command is a port-forwarding command configured to cause a device of the container orchestration platform to initiate port-forwarding to a port of the target container, the port being specified in the container command.

17. The method of claim 14, wherein the container command is an exec command configured to cause the target container to run a target command specified in the exec command.

18. The method of claim 14, further comprising:
intercepting, using the webhook, another container command issued to the API by the user or another user of the container orchestration platform;
in response to intercepting the other container command, determining that the other container command does not violate the security policy; and
in response to determining that the other container command does not violate the security policy, allowing the other container command to be executed by one or more containers of the container orchestration platform.

* * * * *